United States Patent

[11] 3,564,300

[72] Inventor Robert A. Henle
Hyde Park, N.Y.
[21] Appl. No. 710,947
[22] Filed Mar. 6, 1968
[45] Patented Feb. 16, 1971
[73] Assignee International Business Machines Corporation
Armonk, N.Y.

[54] PULSE POWER DATA STORAGE CELL

11 Claims, 5 Drawing Figs.

[52] U.S. Cl. .......... 307/291, 307/238, 307/292, 307/279, 307/304
[51] Int. Cl. .......... H03k 3/26
[50] Field of Search .......... 307/291, 292, 296, 238, 279

[56] References Cited

UNITED STATES PATENTS

| | | | |
|---|---|---|---|
| 2,920,215 | 1/1960 | Lo | 307/291 |
| 2,982,870 | 5/1961 | Hilbider | 307/238 |
| 3,226,574 | 12/1965 | Winkler | 307/292 |
| 3,309,534 | 3/1967 | Yu | 307/304 |
| 3,423,737 | 1/1969 | Harper | 307/291 |

*Primary Examiner*—Donald D. Forrer
*Assistant Examiner*—David M. Carter
*Attorneys*—Hanifin and Clark and Kenneth R. Stevens

ABSTRACT: A semiconductor storage cell for use in monolithic memories that perform storage and/or logic and storage functions. These cells each comprise a pair of semiconductor devices which are coupled together to form a bistable circuit. The bistable circuit is intermittently connected to a power supply in such a manner that the internal storage charge characteristics of the monolithic cell present a high-impedance discharge path when the power supply is in an off state. When the power supply is turned on the remaining voltage on the storage charge circuit is sufficient to insure that the monolithic memory cell attains its previous bistable state which existed prior to the power supply being turned off.

INVENTOR
ROBERT A. HENLE

BY Kenneth R. Stevens

ATTORNEY

PULSE POWER DATA STORAGE CELL

BACKGROUND OF THE INVENTION

The present invention relates to semiconductor storage cells and more particularly to semiconductor storage cells that are pulse powered to reduce power dissipation.

One problem with the use of semiconductor bistable circuits as storage cells in monolithic computer memories is that they dissipate energy and thereby cause heating of the monolithic memory modules. To keep the modules at lower operating temperature where reliability is highest it is necessary that the modules be cooled. As the bit density, or the number of cells in a given area of the module, is increased the heating problems become more critical and very sophisticated and thus expensive cooling apparatus must be employed. For this reason, dissipation of heat and the cost of supplying power to the cells materially adds to the cost of monolithic computer memories and is also a limiting factor on the speed of operation of the memory because of the increased size of the memory required for adequate cooling. Therefore it is desirable to reduce the power dissipation of the monolithic memory cells. In the past, pulse powering of bistable circuits have required external loading and additional switching circuits to insure that the memory cell returns to its previous state when the power is switched on. Accordingly, the external load severely hampers the overall performance of the bistable circuit. Additionally, these circuits are more costly and difficult to manufacture and have not been applied to the larger array required for monolithic memories.

It is an object of the present invention to reduce power dissipation in monolithic memory cells without affecting circuit performance.

It is another object of this invention to reduce power dissipation in monolithic memory cells while maintaining simple and inexpensive fabrication techniques already known.

SUMMARY

The present invention reduces power dissipation in bistable monolithic semiconductor cells by intermittently powering the device. The power supply to the monolithic memory cell automatically creates a high impedance discharge path for the charge stored on the memory cell when the power is turned off. The internal circuit capacitances maintain a sufficient residue charge to insure that the bistable circuit attains its previous state when the power is reapplied.

DESCRIPTION OF THE DRAWINGS

The foregoing and other objects, features and advantages of the invention will be apparent from the following more particular description of the preferred embodiments of the invention as illustrated in the accompanying drawings of which.

DESCRIPTION OF EMBODIMENTS

Figure 1:
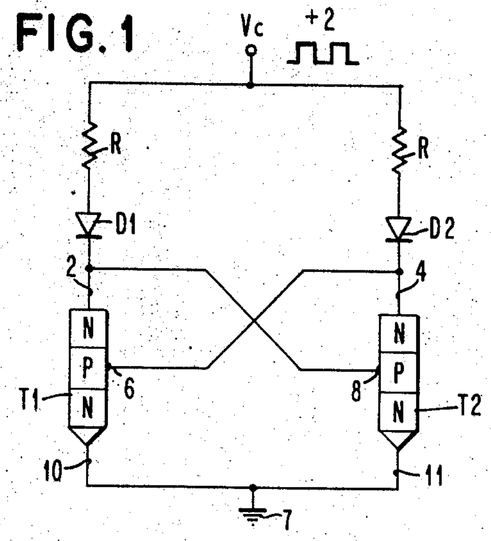
FIG. 1 is a schematic diagram of a storage cell of the present invention.

Now referring to FIG. 1 which shows a basic monolithic memory cell unit 1 of the present invention a pulse power supply V*c* provides operating voltages to a pair of directly cross-coupled transistors T1 and T2 which form a bistable circuit. The operating or bias voltages for the transistor T1 having a collector terminal 2, a base terminal 6, and an emitter terminal 10, is connected through a load resistor R and a diode D1 and then to ground connection 7. Likewise, the connections to transistor T2 having collector, base and emitter terminals designated as 4, 8, and 11, respectively, are provided through load resistor R and a diode D2 and ultimately to ground through the emitter terminal 12. Obviously, the transistors T1 and T2 also receive operating voltages through their directly cross-coupled base cone connections in a conventional manner.

OPERATION OF FIG. 1

Figure 2:
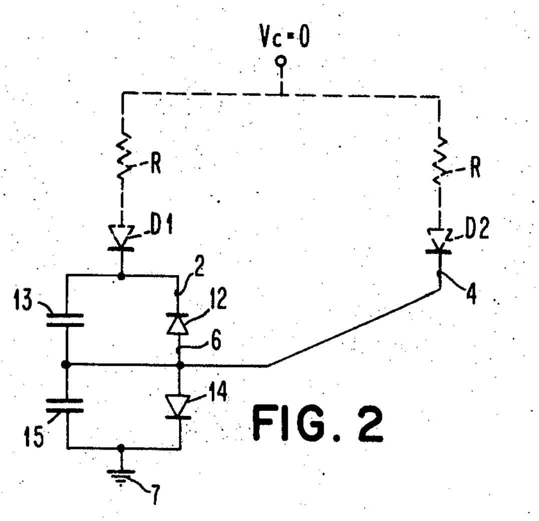
FIG. 2 is a schematic diagram of the effective storage charge circuitry for the memory cell of FIG. 1 during a power-off cycle, and the selected controlled high-impedance discharge path.

Now referring to FIGS. 1 and 2, let it be assumed that T1 is conducting and T2 is off. With Vc at 2 volts the cell will draw a current of approximately 1.8ma. for a continuous power dissipation of 3.6mw. In this steady state condition the collector terminal 4 will be at approximately .75 voltage positive and the other collector terminal 2 will be at approximately 0.5 volts positive. If now Vc is made equal to zero, both collectors will show a small rapid initial drop in voltage due to capacitive coupling across the collector loads. The unilateral conducting devices or diodes D1 and D2 become biased into their high resistance state (D2 is reverse biased, D1 may have a slight forward bias). With the power off and the diodes D1 and D2 in their high-resistance off states the memory cell of FIG. 1 is in effect transformed into the circuit as illustrated in FIG. 2.

Now referring to FIG. 2, the diodes D1 and D2 effectively remove the pair of load resistances R from the circuit during the power-off cycle. A diode 12 and a capacitor 13 exist between the terminal 2 and the base terminal 6. Further, a diode 14 and a capacitor 15 exist between the terminal 6 and the ground connection 7. The solid line circuit represents the effective high-impedance path for the storage discharge circuit while the dotted lines indicate the portion of the circuit which is removed when the D1 and D2 diodes become back biased, that is, when the power Vc is off. The elements 12, 13, 14 and 15 are equivalent circuit elements which essentially represent the collector-to-base diode and capacitance, and the base-to-emitter diode and capacitance when the collector current Ic of T1 is approximately zero due to the power being switched off. Of course during this time the transistor T2 is out of the circuit, since it is cut off.

Accordingly, it can be seen that the primary discharge path from terminal 4 is through the equivalent diode 14 inasmuch as T2 is off and the back-biased diodes D1 and D2 have effectively removed the rest of the circuit, as indicated in dotted lines. If the power supply V*c* is reapplied or regenerated at an appropriate time during the discharge of the voltage from the terminal 4, the residue charge stored in the equivalent circuit of FIG. 2 will cause the bistable circuit to assume its previous state, that is, T1 will be on and T2 will be off. If the D1 and D2 diodes were not in the circuit, the voltage on terminal 4 would discharge very rapidly during the off power cycle and consequently it would be ineffective to return the bistable circuit to the same predetermined state as that state which existed prior to the power supply being turned off. Thus, the diodes D1 and D2 have actually selected a controlled high impedance discharge path.

Additionally, it is appreciated that by limiting the discharge path to that shown in FIG. 2 an important advantage results. Namely, as the voltage at terminal 4 begins to decrease and discharge to ground, the diode 14 between terminals 6 and 7 will present a nonlinear or increasingly higher impedance to the discharge path and thus help to maintain the existing voltages. This high-impedance discharge path helps to insure that when the bistable circuit will assume its previous state when the power supply is again turned on. Although the bistable circuit actually comprises more than the transistors T1 and T2 alone, for purposes of explanation they have been designated as the bistable circuit to distinguish from the entire memory cell which has been indicated as element 1 and includes the load resistances, etc.

In summary, the addition of the pair of diodes D1 and D2 in the monolithic memory cell has allowed for better utilization of the storage charge characteristics of the transistors in that they are effective to select a high-impedance discharge path during the power-off cycle. These concepts, when implemented, allow for a great saving in power dissipation, since it is not necessary to maintain a continuous supply of operating voltages at Vc, but allow for a pulse power supply. Moreover, these structural implementations may be adapted to existing monolithic memory cells with a minimum of fabrication expense and difficulty, since only minor structural changes are required over the conventional monolithic memory cell. The power-off cycle is illustrated as being zero volts. However, any voltage level which is insufficient to sustain stored information in the cell falls in this category. In other words, zero volts and a nonsustaining voltage level are equally appropriate descriptive terms.

DESCRIPTION OF FIG. 3

Figure 3:
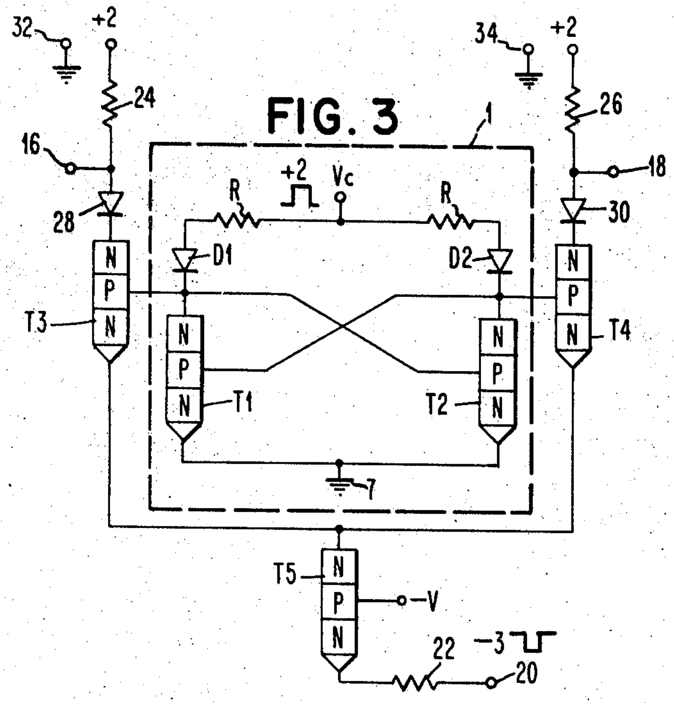
FIG. 3 is a schematic diagram illustrating how the memory cell of FIG. 1 may be adapted to perform read and write operations.

Now referring to FIG. 3 which shows how the basic memory cell 1 of FIG. 1 may be combined to provide read and write operations.

In order to provide a read or interrogate operation of the memory cell 1, a pair of transistors T3 and T4 are connected in a differential amplifying fashion to the cell 1 to provide outputs at a terminal 16 and at a terminal 18. To read or interrogate, the commonly coupled emitters of transistors T3 and T4 are connected to a negative interrogation pulse by interrogate terminal 20, resistor 22 and a transistor T5. During this operation, the collectors of the transistors T3 and T4 are connected to a positive bias supply by resistors 24 and 26, and diodes 28 and 30, respectively.

In order to write information into the memory cell 1, it is necessary to pulse the interrogate terminal 20 and also connect the collectors of the transistors T3 or T4 to ground at a pair of write terminals designated by 32 and 34, respectively.

OPERATION OF FIG. 3

Firstly, in the read or interrogate mode of operation the condition of the memory cell 1 may be readily sensed by applying a negative pulse to the interrogate terminal 20 or at the coincidence of a positive pulse at the base of T5 and a negative pulse at the emitter 20. In a conventional manner and with the collectors of the transistors T3 and T4 connected to the positive bias supply, the output terminals 16 and 18 will provide an output signal indicative of the states of the transistors T1 and T2 forming the bistable circuit. It has been found that it is possible to obtain cell readout under certain conditions with Vc at zero volts, that is, without a regeneration pulse during an off cycle. However for the most reliable results Vc and the terminal 20 will be pulsed simultaneously with the appropriate voltages as indicated. This insures that the stored in the bistable circuit is not lost during readout.

During the write operation, it is necessary to connect the desired collector terminal of either transistor T3 or T4 to the ground connection terminals designated as write terminals 32 and 34. For example assuming that the transistor T2 is off, then its collector voltage and accordingly the base of the transistor T4 will be at approximately .75 volts or positive with respect to the other transistor T3 in the differential amplifier. Under these circuit conditions, the application of a negative pulse to the terminal 20 causes T5 to conduct which in turn allows base current to be drawn from the saturated transistor T1 and then through T4 and T5. Eventually due to this action, the saturated transistor T1 will cut off and transistor T2 will be conducting which then completes the write operation.

It has been determined that the amount of charge decay on the monolithic memory cell of FIG. 1 is related to the duration of the off power cycle and also to the effect due to temperature. The decrease in storage time due to temperature is apparently due to the effect of $I_{CEO}$, that is, the collector-to-emitter current with the base circuit open.

In one specific example it was found that a Vc pulse duration longer than 35 nanoseconds had no effect on the allowable pulse period of the monolithic memory cell shown in FIG. 1. Additionally, it was found that in order to insure the return of the bistable circuit to its previous memory stage state a Vc pulse period which was no greater than 27 milliseconds was required, under ambient conditions. In this specific example, the average power dissipation in the memory cell went from $3.6 \times 10^{-3}$ watts to $4.7 \times 10^{-9}$ watts. Again, these examples are merely illustrative and are not meant to limit the scope of the disclosed invention in any manner.

Figure 4:
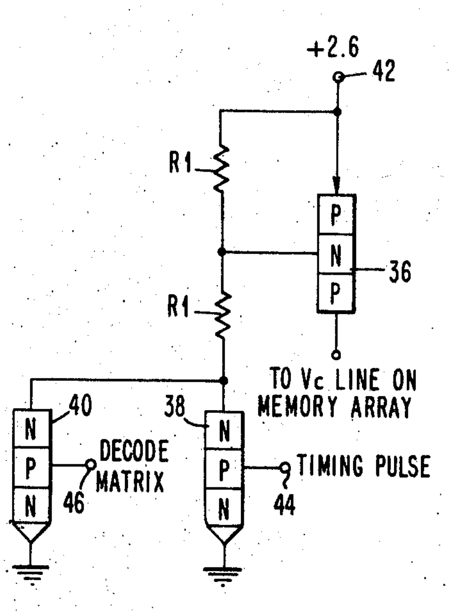
FIG. 4 shows a schematic diagram illustrating a power supply or driver circuit which could be employed during read and write operations.

As previously discussed, it is most desirable to perform read or write operations which coincide with the on power cycle, that is, when Vc is on. As shown in FIG. 4, Vc can be driven from an OR gate comprising a plurality of transistors 36, 38, and 40 from a positive voltage source connected to a terminal 42, and a pair of resistors R1. One input terminal 44 to the OR gate could be utilized as a timing pulse with a frequency, for example, determined by the operating temperature of the monolithic memory cell so as to turn Vc on. The other input terminal 46 would be from the decode logic (not shown) and would apply power to an array of cells (one of which is illustrated in FIGS. 1 or 3) so as to select the actual cell which contains the address. Under these conditions full power would be applied to an array at terminal 44 only during the time that a cell contained in that array was being read from or written into and at terminal 44 during normal regeneration, that is irrespective of read or write operations. Clearly, other well-known driver circuits could be utilized for the driver circuit of FIG. 4 and which could be further employed to switch power on in a sequential mode if desired.

Figure 5:
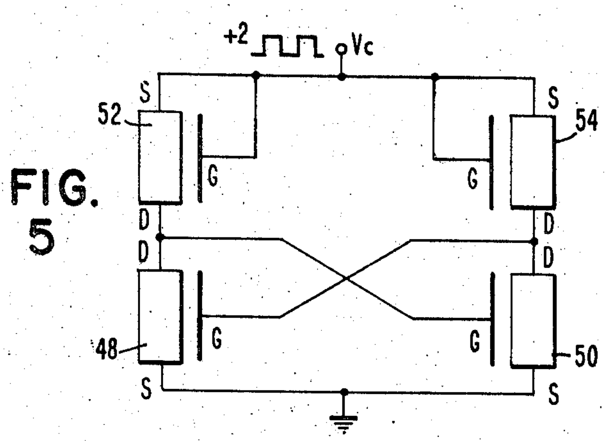
FIG. 5 shows another embodiment of the basic cell as shown in FIG. 1 utilizing MOS enhancement devices.

Now referring to FIG. 5 which shows another embodiment of the basic monolithic memory cell previously shown in FIG. 1. This cell comprises symmetrical, P channel, enhancement mode, metal oxide semiconductors (MOS). These devices are also called insulated gate field effect transistors (FET'S) and have three terminals called the gate G, drain D, and source S. In the monolithic memory cell of FIG. 5, a pair of FET's 48 and 50 form a directly coupled bistable circuit which finds its counterpart in the bistable circuit of FIG. 1 comprising the transistors T1 and T2, that is, the two cells are essentially equivalent to the other. Similarly, a pair of FET's 52 and 54 are operative in a manner similar to the diodes D1 and D2 of FIG. 1 so as to provide a high-impedance discharge path when the supply voltage Vc goes to zero. In other words, the embodiment of FIG. 5 operates essentially in the same manner as that discussed with reference to FIG. 1.

It is also appreciated that the transistors T1 and T2 of the monolithic memory cell shown in FIG. 1 may be replaced by multiemitter transistor cells which may operate either in a saturated or limited saturation mode without effecting the basic theory of operation as described with reference to FIG. 1. Also, the individual monolithic memory cell may be incorporated into a multicell memory unit with reading and writing operations accomplished by essentially the same means as that described with reference to FIG. 3.

While the invention has been particularly shown and described with reference to preferred embodiments thereof, it will be understood by those skilled in the art that various changes in form and details may be made therein without departing from the spirit and scope of the invention.

I claim:

1. A pulse-powered monolithic memory cell comprising:

a. a bistable circuit means having internal storage charge means;

b. a power supply connected to said bistable circuit means for providing predetermined operating voltages at the output of said power supply;

c. means connected to said power supply for turning said power supply to an on and to an off or nonsustaining condition, the on condition being of a sufficient level to maintain a data bit stored in said bistable cell, and the off or nonsustaining condition being below the necessary level to maintain a data bit stored in said bistable cell;

d. said bistable circuit means and said storage charge means being maintained at said predetermined operating voltages when said power supply is turned on so that said bistable circuit means is maintained in either one of two predetermined data bit states;
e. semiconductor switch means connected to said power supply and responsive thereto for selecting a controlled high-impedance discharge path for said storage charge means when said power supply is in an off or nonsustaining condition; and
f. said power supply being turned on before the said storage charge means becomes ineffective to return said bistable circuit means to the said same predetermined data bit state as that predetermined data bit state which existed prior to said power supply being turned to an off or nonsustaining condition.

2. A pulse-powered monolithic memory cell comprising:
a. a bistable circuit means having internal storage charge means;
b. a power supply means having an output;
c. means connected to said power supply for turning said power supply to an on and to an off nonsustaining condition;
d. load means connected between said power supply output and said bistable circuit means for providing predetermined operating voltages to said bistable circuit and said storage charge means so that said bistable circuit is maintained in either one of two data bit predetermined states;
e. semiconductor switch means connected between said power supply and said bistable circuit;
f. said semiconductor switch means being turned off when said power supply is in an off or nonsustaining condition so as to select a controlled high-impedance discharge path for said storage charge means; and
g. said power supply being turned on before the said storage charge means becomes ineffective to return said bistable circuit means to the same data bit predetermined state as that predetermined state which existed prior to said power supply being turned to an off or nonsustaining condition.

3. A pulse-powered monolithic memory cell as in claim 1 wherein said semiconductor switch means comprises unilateral conduction means connected between said power supply output and said bistable circuit and which is in an off state when said power supply is off.

4. A pulse-powered monolithic memory cell as in claim 2 wherein said high-impedance discharge path for said storage charge means includes a nonlinear impedance which is increasing in value when said storage charge means is discharging while said power supply is off.

5. A pulse-powered monolithic memory cell as in claim 2 wherein:
a. said semiconductor switch means is connected in series between said power supply and said bistable circuit; and
b. said semiconductor switch means is responsive to said power supply being turned to an off or nonsustaining condition so as to substantially remove said load means from high impedance discharge path for said storage charge means.

6. A pulse-powered monolithic memory cell as in claim 1 further including means connected to said bistable circuit for reading information from and writing information into said bistable circuit means.

7. A pulse-powered monolithic memory cell as in claim 2 further including:
a. differential sense means connected to said bistable circuit means;
b. said differential sense means being responsive to an energization pulse for reading information from said bistable circuit; and
c. means connected to said differential sense means for writing information into said bistable circuit means.

8. A pulse-powered monolithic memory cell as in claim 4 wherein said bistable circuit further includes a pair of cross-coupled transistors.

9. A pulse-powered monolithic memory cell as in claim 6 wherein:
a. said means connected to said power supply for turning said power supply to an on and to an off condition further includes;
b. a first input terminal means responsive to a predetermined frequency source of power for turning said power supply to an on condition before said storage charge means becomes ineffective to return said bistable circuit means to said same predetermined data bit state as that predetermined data bit state which existed prior to said power supply being turned off or nonsustaining condition; and
c. a second input terminal responsive to an energization source for also turning said power to an on condition when reading information from or writing information into said bistable circuit means.

10. A pulse powered monolithic memory cell as in claim 4 wherein said bistable circuit further includes a pair of cross-coupled field effect transistors.

11. In a storage cell having a pair of cross-coupled semiconductor devices with internal capacitance which are connected through a load to a source of power so as to form a bistable circuit which with one of said semiconductor devices biased conductive and the other of said semiconductor devices biased substantially nonconductive stores a bit of data, the improvement which comprises:
a. semiconductor means in said load for controlling the current between the source of power and the pair of semiconductor devices, said semiconductor means having a control terminal which can be biased to turn the current on to supply power through said load to the pair of semiconductor devices or off to reduce the power supplied through said load to the semiconductor devices below the level necessary to retain a bit of data stored in the bistable circuit;
b. pulse means coupled to said control terminal for normally biasing said current off while charge stored in said internal capacitance maintains said one semiconductor device biased conductive and said other semiconductor device biased substantially nonconductive and for periodically rendering said current on to charge said internal capacitances at intervals sufficiently short to prevent the loss of the stored data.